March 20, 1951 C. A. MAXWELL 2,545,527
METHOD OF FORMING AN EXPANDED TUBE AND TUBE SEAT
CONNECTION WITH AN INTERVENING METALLIC BONDING
STRATUM OF LOW FUSION TEMPERATURE
Filed June 21, 1947

INVENTOR
Carl A. Maxwell
BY
W. M. Holbrook
ATTORNEY

Patented Mar. 20, 1951

2,545,527

UNITED STATES PATENT OFFICE 2,545,527

METHOD OF FORMING AN EXPANDED TUBE AND TUBE SEAT CONNECTION WITH AN INTERVENING METALLIC BONDING STRATUM OF LOW FUSION TEMPERATURE

Carl A. Maxwell, Akron, Ohio, assignor to The Babcock & Wilcox Company, Rockleigh, N. J., a corporation of New Jersey Application June 21, 1947, Serial No. 756,304

1 Claim. (Cl. 29—157.5)

The invention relates to a method of joining tubular members to pressure vessels in installations of heat exchange apparatus operable at high fluid pressures and with high fluid and heating gas temperatures.

In such heat exchangers, as exemplified by modern high pressure steam generators, portions of the pressure fluid containing system, such as the superheater tubes and their connected headers, quite frequently operate with superheated steam temperatures in excess of 900° F., and are subjected to heating gases of 2000° F. and above. Under such conditions the metal of the tubes is at or above the temperature of the steam flowing therein. Such temperatures are frequently subject to rapid change due to changes in operating ratings.

Where high pressure and high temperature steam tubes are joined to a manifold or collecting header, the joints should be of such a character that they are not only permanently tight under operative conditions but also such that the joints can be economically made in the field in assembling the component parts which are of such size and shape as to preclude shop assembly in the majority of instances.

In connection with the assembly of such tubular superheater elements with their headers, it has frequently been the practice to shopweld stub tubes to the headers and make the proper heat treatment of such an assembly in the shop, and then join the superheater tube elements to the stub tubes by welding, in the field assembly. Such a method not only involves the making of two joints for each tubular connection but difficulties are sometimes experienced in accomplishing an adequate field juncture of a stub and a superheater tube element because of inaccessibility and other factors which effect the qualitative character of the welded joint. The requirement of post welding heat treatment of welded joints and adjacent metal where some alloys are utilized is one of the more important complicating factors involved in a welded joint assembly.

It is an object of the invention to provide a method whereby a superheater tube or other tubular element may be joined to a header in a single joint and in such a manner that the joint will not only be adequately structurally strong to withstand the temperature, pressure, and loading strains imposed during operating conditions, but will also continue to be fluid pressure-tight under such conditions.

More specifically it is an object of the invention to provide a structurally strong expanded tube and tube seat assembly in which the exterior wall of the tube and the surrounding tube seat metal are metallically sealed for high pressure operating conditions by the application of heat at a temperature below that at which the metal of the tubes would require heat treatment to insure adequate metallurgical characteristics for the operative conditions.

Another object of the invention is the provision of a metallically bonded tube and tube seat pressure vessel connection of extended cylindrical area.

In accomplishing the above indicated results, the illustrative method involves the use of a non-ferrous alloy or composition, between a tube and its tube seat, and a particular sequence of applications of pressure and heat, without reaching such temperatures as will cause deterioration in the metal of the tube or its tube seat from either the standpoint of local stresses or the standpoint of grain structure of the metals involved, and without the utilization of a flux in conjunction with the alloy used in the bonding method.

The invention will be described by reference to an illustrative procedure, and other objects of the invention will appear as the description proceeds. The description refers to the accompanying drawings which are believed to be helpful to an understanding of the invention.

Figure 3:
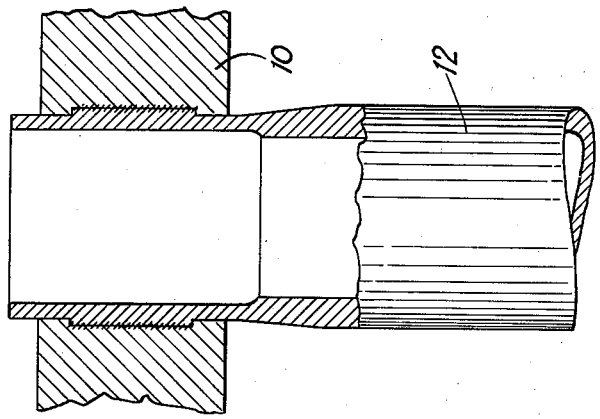
Fig. 3 is a sectional view of the completed tube and tube seat construction.

In the drawings, the tube sheet 10 is of steel plate construction, of considerably greater wall thickness than that of the tube 12 to be joined thereto, and it is to be understood that the tube sheet 10 is representative, and, in many cases, it will be the wall of an alloy steel header of an internal diameter several times that of the associated tube.

In the illustrative procedure, a recessed tube seat 14 is milled or machined in the tube sheet 10 to such conformation as that shown.

The illustrative tube sheet has an annular groove 16 of a width slightly greater than the width (lengthwise of the tube 12) of the annular projection 18 upon the tube. For example, in a tube having an internal diameter of 1.845 inches, the width of the annular projection on the tube may be .401 inch and the width of the groove 16 in the tube seat .421 inch.

Figure 1:
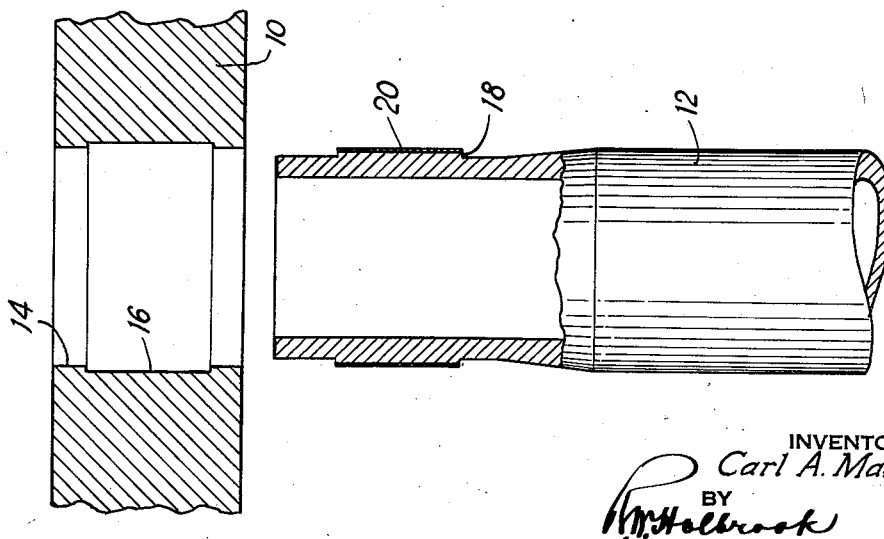
Fig. 1 is a diagrammatic view illustrating a tube and tube seat machined to the desired formation prior to their association in operative relationship.

After the tube seat and the end of the tube are machined as indicated, the illustrative procedure involves the coating or covering of the tube projection 18 with a stratum of a metallic alloy of such characteristics that, with the subsequent application of heat, it will form, in the absence of oxide creating conditions, an integral bond between the metal of the tube and the metal of the tube sheet. Such a coating is indicated at 20 in Figs. 1 and 2 of the drawings.

The coating 20 is preferably of a non-ferrous alloy which has a fusion point considerably below that of the metal involved in either the tube or tube sheet. In practice, the coating 20 has been formed by the metallic foil stratum of a thickness of the order of .005″ and having a chemical composition approximately such as one of the following analyses:

QUANTITATIVE CHEMICAL ANALYSIS

Example I.—Non-ferrous alloy

|   | Per cent |
|---|---|
| 1. Silver | 39.8 |
| 2. Copper | 30.3 |
| 3. Zinc | 27.4 |
| 4. Nickel | 2.3 |
| 5. Iron | 0.4 |
| 6. Tin | 0.1 |

Example II.—Non-ferrous alloy

|   | Per cent |
|---|---|
| 1. Copper | 14.5–16.5 |
| 2. Silver | 49 –51 |
| 3. Zinc | 14.5–18.5 |
| 4. Cadmium | 17 –19 |

Figure 2:
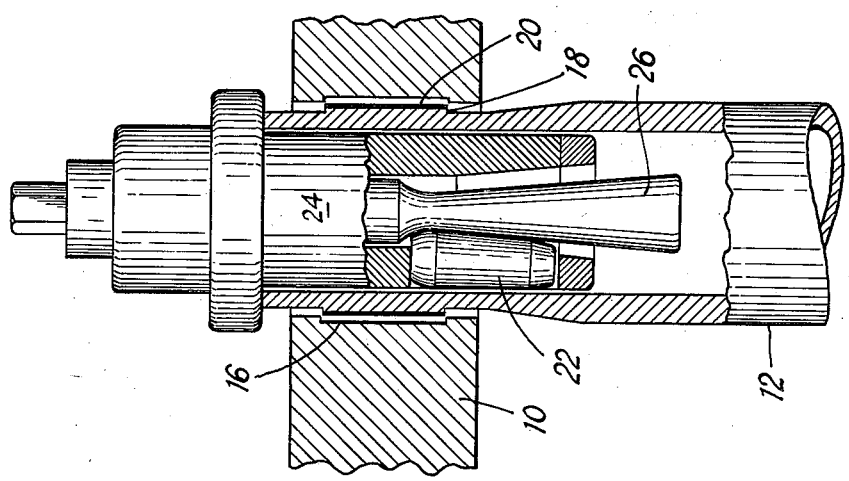
Fig. 2 is a diagrammatic view, mainly in section, showing the tube with its non-ferrous alloy coating about to be expanded into the tube seat.

Before the application of the coating 20 to the projection 18 of the tube, the surfaces of both the tube seat and the tube are thoroughly cleaned so as to remove dirt, grease, and other interfering foreign matter. After the application of the coating the tube is placed in position within the tube seat as indicated in Fig. 2 of the drawings. This involves the alignment of the projection 18 with the groove 16 of the tube seat.

The next step in the illustrative procedure is to expand the tube within the tube seat. This is done by such a roller expander as that indicated in Fig. 2. This expander involves one or more tube expanding rollers such as 22, seated within a roller cage 24 and caused to function by the operation of a tapered mandrel 26, the construction and operation of the expander being more completely described in the patent to C. A. Maxwell, 2,357,123, dated August 29, 1944. This expanding operation causes the tube to be tightly locked in the tube seat with the tube projection 18 and its non-ferrous coating 20 completely filling the groove 16 in the tube seat, these elements being physically related (after the initial expanding) in the manner indicated in Fig. 3 of the drawings. This expanding operation not only locks the tube in the tube seat, but it also causes the exclusion from the bonding interface of all gas or air which might otherwise act as a partial source of metallic oxide. Thus the illustrative bond may be produced without a flux.

After the initial expanding as above described, the expanded tube and the tube seat are heated.

In a test of the invention with a carbon steel header and carbon steel tube with a non-ferrous composition similar to that given for Example I, the construction was heated in a furnace to a temperature of approximately 1280° F., and a similar construction employing a coating corresponding generally to Example II was heated to a temperature of 1180° F., a temperature in each instance preferably slightly above the melting point of the alloy involved. In either case no flux was employed.

As its next step, the illustrative procedure involves the cooling of the construction to room temperature. Subsequently, the tube is re-expanded in the same manner as described above. In the above indicated tests both constructions were cut open in order that it might be determined whether or not there was an effective metallic bond between the alloy and the metals on either side thereof. This inspection and subsequent microscopic examination of sections through the tube seats revealed that the alloy coating had not only completely filled the annular spaces between the tube surface and the surface of the tube seat, but that it had also effected a true metallic bond with the steel, by interdiffusion. One phase of the alloy seemed to have diffused into the ferrite of the steel without leaving a trace of the previous plane of junction. Furthermore, there was no indication of any oxide film at the junction between the alloy and the steel. This result was one which was unexpected by those skilled in the use of bonding alloys similar to those used in the illustrative process. The filler alloy not only filled the space between the tube surface projection and the matching groove within the tube seat, but also penetrated within the remaining space between the expanded tube and the tube seat.

What is claimed is:

In the formation of a tube and tube seat construction for fluid heat exchange apparatus operating at pressures, machining the tube seat end of a steel tube to form an annular exterior projection thereon, machining a tube seat in the wall of a steel pressure part to form a corresponding tube seat with an internal annular groove to receive the tube projection, providing upon said projection a metallic bonding stratum of a fusion temperature lower than the fusion temperature of either the wall or the tube, disposing the tube seat portion of the tube within the tube seat of the wall, expanding the tube seat portion of the tube within the tube seat and thereby expelling all air or oxide forming gas from the juncture zone and forming a tight juncture between the tube and the wall, heating the expanded tube and wall construction to a temperature of the order of the fusion point of the bonding stratum and thereby bonding the stratum with the steel on either side thereof by interdiffusion of the metallic constituents without the use of a flux, and re-expanding the tube against the tube seat.

CARL A. MAXWELL.

REFERENCES CITED

The following references are of record in the file of this patent:

UNITED STATES PATENTS

| Number | Name | Date |
|---|---|---|
| 560,919 | O'Toole | May 26, 1896 |
| 789,622 | McCullough | May 9, 1905 |

(Other references on following page)

UNITED STATES PATENTS

| Number | Name | Date |
|---|---|---|
| 1,722,025 | Wagener | July 23, 1929 |
| 1,840,724 | Koehring | Jan. 12, 1932 |
| 1,908,020 | Hulsart | May 9, 1933 |
| 1,951,833 | Maupin | Mar. 20, 1934 |
| 1,979,760 | Mueller | Nov. 6, 1934 |
| 1,995,616 | Kamack | Mar. 26, 1935 |
| 2,098,379 | Dodge | Nov. 9, 1937 |
| 2,255,301 | Thompson | Sept. 9, 1941 |
| 2,288,094 | Karmazin | June 30, 1942 |
| 2,346,413 | Broecker | Apr. 11, 1944 |
| 2,350,410 | Murphy | June 6, 1944 |

FOREIGN PATENTS

| Number | Country | Date |
|---|---|---|
| 529,879 | Germany | 1931 |

OTHER REFERENCES

"Steel," Sept. 10, 1945, pp. 111 and 156.